Sept. 13, 1927.
H. JACOBY
1,642,303
DEVICE FOR ELECTRICALLY EXHIBITING A DANGER SIGNAL ON A LOCOMOTIVE
Filed April 21, 1927
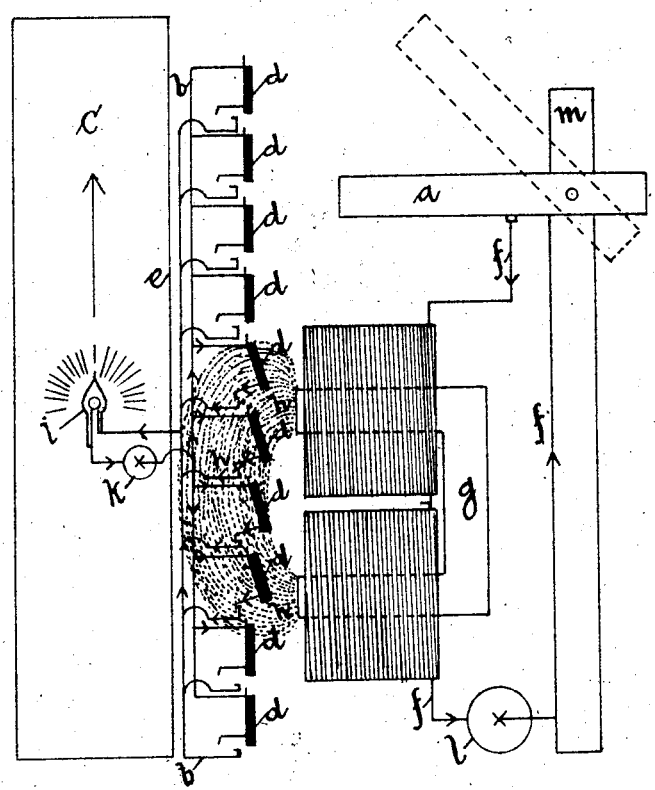

Patented Sept. 13, 1927.

1,642,303

UNITED STATES PATENT OFFICE.

HERMANN JACOBY, OF EBERSTADT, NEAR DARMSTADT, GERMANY.

DEVICE FOR ELECTRICALLY-EXHIBITING A DANGER SIGNAL ON A LOCOMOTIVE.

Application filed April 21, 1927, Serial No. 185,645, and in Germany March 16, 1927.

The invention relates to a device for exhibiting a danger signal on a locomotive passing a semaphore at danger.

The invention is illustrated diagrammatically in the accompanying drawing.

The novelty of this device consists in the use of two continuous current-circuits $b$ and $f$ independent of each other which have only an occasional connexion by transfer of an electro-magnetic field $h$. The one circuit $b$ is installed on the locomotive-engine $c$ and has for closing of the circuit $b$ a complete register of relay armatures $d$ fitted on the under side $e$ along the engine $c$ while the other circuit $f$ with the electro-magnet $g$ is arranged on the earth between the rails and connects to the stop-signal-arm $a$ of a semaphore which closes the circuit $f$ when the signal-arm $a$ is put horizontal for "stop," whereby the current $f$ flows out of battery or A. C. generator $l$ and energizes the electromagnet $g$ for sending out its electro-magnetic field $h$, which is traversed by all relay armatures $d$ fitted along the under side $e$ of the passing engine $c$ and all relay-armatures $d$ are attracted in sequence and close the circuit $b$ of battery $k$ for exhibiting the danger signal $i$, which is controlled over the multiple circuits including the respective armatures $d$.

Having now particularly described and ascertained the nature of this said invention and in what manner the same is to be performed I declare that what I claim is:

In a device for exhibiting a danger signal on a locomotive passing a semaphore at danger, the use of two current-circuits which are independent of each other and have only an occasional connexion by transfer of an electromagnetic field, the one circuit being installed on the locomotive-engine and having for closing of said one circuit a complete register of relay armatures fitted on the under side along the passing locomotive, while the other circuit is arranged with an electromagnet on the earth between the rails and is connected to the stop signal arm of the semaphore which closes said other circuit when the signal-arm is put for "stop" and energizes the electromagnet for sending out its electromagnetic field which is traversed by all the relay-armatures in sequence and attracts them and therefore closes the circuit for exhibiting a danger signal on the locomotive, which signal is controlled over multiple circuits including the respective armatures.

In testimony whereof I affix my signature.

HERMANN JACOBY.